US005975814A

United States Patent [19]
Pomp

[11] Patent Number: 5,975,814
[45] Date of Patent: Nov. 2, 1999

[54] CYLINDRICAL HEAD BORING TOOL

[75] Inventor: Thomas Pomp, Remscheid, Germany

[73] Assignee: FAMAG-Werkzeugfabrik Friedr. Aug. Mühlhoff GmbH & Co., Remscheid, Germany

[21] Appl. No.: 09/010,210

[22] Filed: Jan. 21, 1998

[30] Foreign Application Priority Data

Jan. 24, 1997 [DE] Germany ........................ 197 02 423

[51] Int. Cl.$^6$ .................................... B23B 51/02
[52] U.S. Cl. .................................... 408/225; 408/213
[58] Field of Search .................................... 408/204, 206, 408/213, 223, 224, 225, 227

[56] References Cited

U.S. PATENT DOCUMENTS

| | | | |
|---|---|---|---|
| 2,613,710 | 10/1952 | Emmons | 408/213 |
| 4,090,807 | 5/1978 | Stewart | 408/213 |
| 4,753,558 | 6/1988 | Jansson | 408/225 |
| 5,193,951 | 3/1993 | Schimke | 408/225 |
| 5,312,207 | 5/1994 | Pomp | 408/225 |

FOREIGN PATENT DOCUMENTS

| | | | |
|---|---|---|---|
| 2005775 | 8/1971 | Germany | 408/213 |
| 3719758 | 1/1989 | Germany | 408/213 |
| 4115030 | 6/1992 | Germany . | |

*Primary Examiner*—Daniel W. Howell
*Attorney, Agent, or Firm*—Martin A. Farber

[57] ABSTRACT

A cylindrical head boring tool (1), such as a Forstner drilling tool, with a main cutting edge (4) having a centering point (5). The main cutting edge extends diametrically across the entire circular cross-section of the boring head (3), the main cutting edge (4) having cut out surfaces (11), and chip channels (7) adjacent the main cutting edge (4). The chip channels (7) open through the outer periphery and extending obliquely through the boring head (3). Each end of the main cutting edge (4) is adjacent a preliminary cutting edge (8) coinciding with the circumference of the boring head (3) for guiding the boring tool (1). The preliminary cutting edge (8) reaches to the edge of the respective other chip channel (7) and forms the peripheral edge of an essentially cylindrically curved wall (6) of the boring head (3). The otherwise smooth wall (6) is interrupted by radial throats (13).

12 Claims, 4 Drawing Sheets

CYLINDRICAL HEAD BORING TOOL

FIELD AND BACKGROUND OF THE INVENTION

The invention relates to a cylindrical head boring tool, for example a forstner-boring tool, a hobby boring tool or the like, with a main cutting edge having a center point and extending essentially diametrically across the entire circular crosssection of the boring head and having shearing surfaces, along with chip channels adjacent the main cutting edge, the chip channels being open through the outer edge and extending obliquely through the boring head, such that each end of the main cutting edge adjoins a preliminary cutting edge which coincides with the periphery of the boring head, for a simple guiding of the boring tool, which preliminary cutting edge reaches to the edge of the respective other chip channel, and which is the essentially cylindrically curved wall of the boring head.

Such cylindrical head boring tools are already known. For example, DE-PS4115030 discloses a cylindrical head boring tool fashioned integrally from solid material, with a shaft-supported boring head which is provided with a central point and two peripheral cutting edges with two generally radially extending main cutting edges. The two main cutting edges are associated with chip channels which are open to the peripheral surface and to the rearward face of the boring head. The base of each chip channel is circularly rounded and extends continuously both to the chip surface of the respective main cutting edge and also to the chip channel side wall lying opposite such chip surface. Further, so-called ring hole cutters are known which include chip channels for conducting chips to the outer wall of the boring head.

SUMMARY OF THE INVENTION

In view of the state of the art described above, it is an object of the invention to provide a cylindrical head boring tool of the same type, but of an improved construction which undergoes reduced warming during the boring process.

According to the invention the otherwise smooth outer wall is interrupted by radial grooves. By reason of these radial grooves, free spaces are created which act to cool the boring head. The removal of chips takes place in the known manner through chip channels provided centrally in the boring head. In contrast to the mentioned ring hole cutters, the radial grooves in the wall of the boring head are not for chip removal. Thus, these grooves can define free spaces which are closed both forwardly and rearwardly of the boring head, with respect to the axial direction. A preferred configuration is one in which the grooves are recesses in the wall. These wall recesses provide desired free spaces for cooling the boring head during the boring operation. Such wall recesses may result from stamping or milling. In accordance with the invention, it is contemplated that the wall recesses form grooves that are either parallel with the axis or at an angle thereto. The grooves can, for example, be cut into the otherwise flat outer wall using an end-milling cutter or the like. Provided that the wall recesses are only for the cooling of the boring head, such recesses can run parallel to the rotational axis of the cylindrical head boring tool. A preferred configuration, however, is one in which the grooves extend at an angle to the boring axis.

It is further contemplated that the grooves have a rectangular or arcuate cross-section. It is further contemplated that the grooves be open at both ends. In accordance with the invention, the cylindrical head boring tool can, in a single operation, be integrally created from solid material. In that case, the grooves serving to conduct heat away from the boring head are preferably milled out. It is further contemplated that the curvilinearly running preliminary cutter, which provides the preliminary cutting edge, have a wedge-shaped cross-section which is formed by a concave surface lying inwardly of the wall. The wall recesses in accordance with the invention preferably extend as far as the preliminary cutting edge whereby, due to the wedge-shaped cross-section of the arcuately extending preliminary cutter, tooth-like preliminary cutting segments are shaped. Due to the tooth-gap structure of the preliminary cutting edge, the warming of the boring head during the boring process is counteracted. It is furthermore of advantage for the shearing surfaces of the main cutting edge to be planes which form essentially a right angle with the respective concave surface. The above-mentioned chip channels of the cylindrical head boring tool open through these shearing surfaces. According to an advantageous further development, it is contemplated that the preliminary cutting edge define a cut-out portion between pairs of adjacent grooves. The tooth-gap-like preliminary cutting edge contacts the workpiece only at spaced points during the boring process, depending upon the configuration. By way of the chosen cut-out portion in the region of a preliminary cutting tooth between two adjacent grooves, there is firstly attained an improved cutting quality in the region of the preliminary cutting edge, and secondly, a decreased warming. In an alternative configuration of the object of the invention, it is contemplated that the projections of radially outstanding tooth portions be constituted of individual teeth. These individual teeth are provided on the outer wall of the boring head and constitute the preliminary cutting edge. Due to the radially outward position of the individual teeth, there are preferably created between pairs of teeth the axially outwardly aligned free spaces. In this connection, it is further contemplated that the individual teeth be made of hard material and be soldered into place within recessed pockets of the boring head with a radial and axial offset. Accordingly, the cylindrical head boring tool is manufactured in sequential stages. Firstly, the boring head with its main cutting edge and the chip channels extending obliquely through the boring head is made integrally from solid material. Thereafter, the individual teeth are set in place within receiver pockets created in the cylindrically curved wall, and finally the soldering of the individual teeth to the boring head takes place. The receiving pockets are configured such that the inserted individual teeth are secured in place on the boring head with a radial and an axial offset. The axial offset provides the preliminary cutting edge. The radial offset of the individual teeth provides a free space between each pair of adjacent individual teeth. The otherwise flat wall of the boring head is interrupted by the projecting individual teeth. This causes a decreased warming of the boring head during the boring process. Finally, it has been found advantageous to provide the receiver pockets with a dovetail insertion cross-section for the individual teeth. By this means there is provided, in the simplest way, a pre-attachment of the individual teeth to the boring head, without further fastening material in the form of wires or the like. The individual teeth have a cross-section which corresponds to that of the receiving pockets, such that, after insertion of an individual tooth, it lies in the recess pocket with a wall gap. After warming the pre-assembled boring tool, silver solder can be introduced into the thus defined gap, to provide a final securing of the individual teeth.

BRIEF DESCRIPTION OF THE DRAWINGS

With the above and other objects and other advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
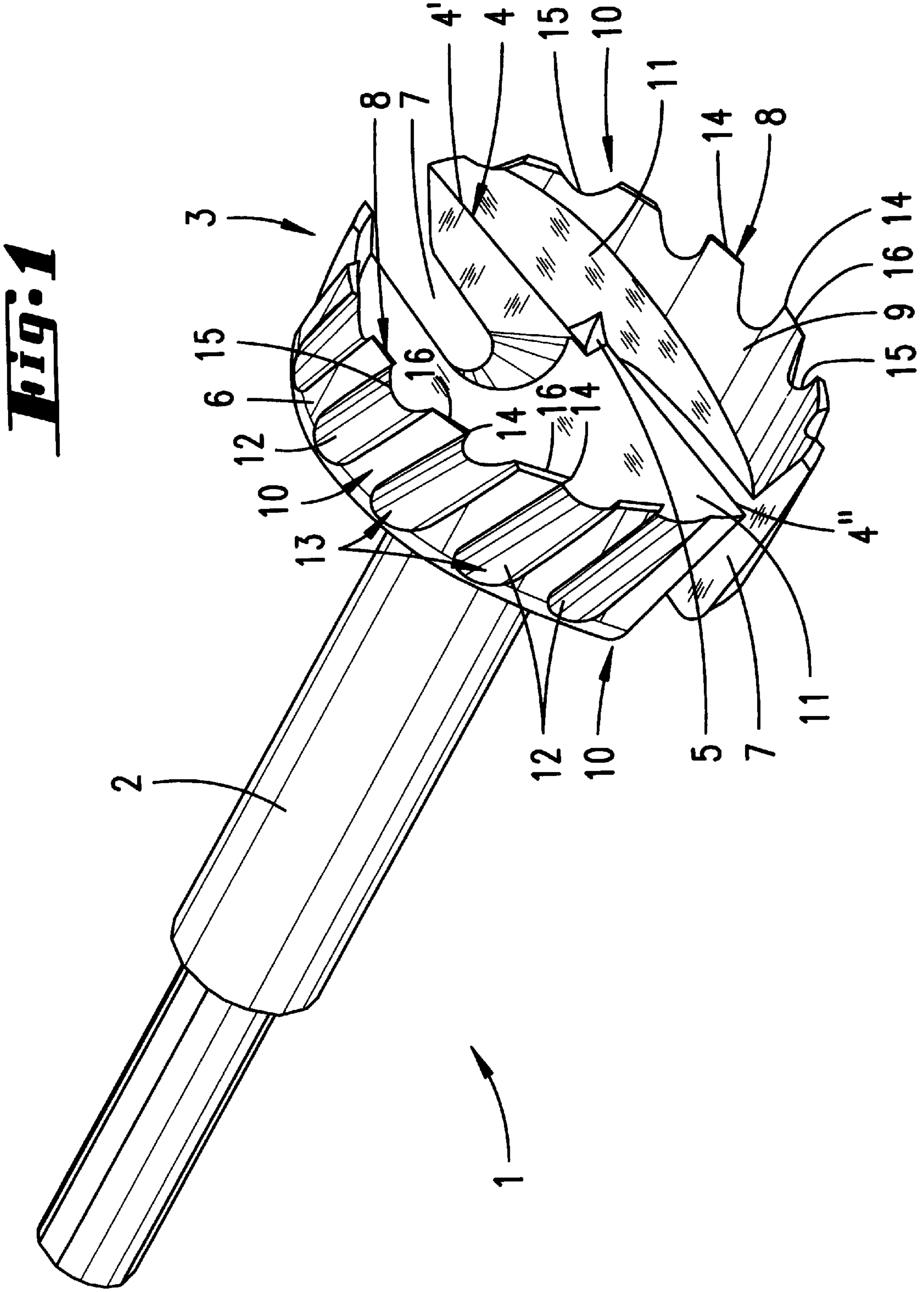
FIG. 1 is a cylindrical head boring tool accordance with the invention, in the form of a Forstner drilling tool, in perspective view, relating to a first embodiment.
Figure 2:
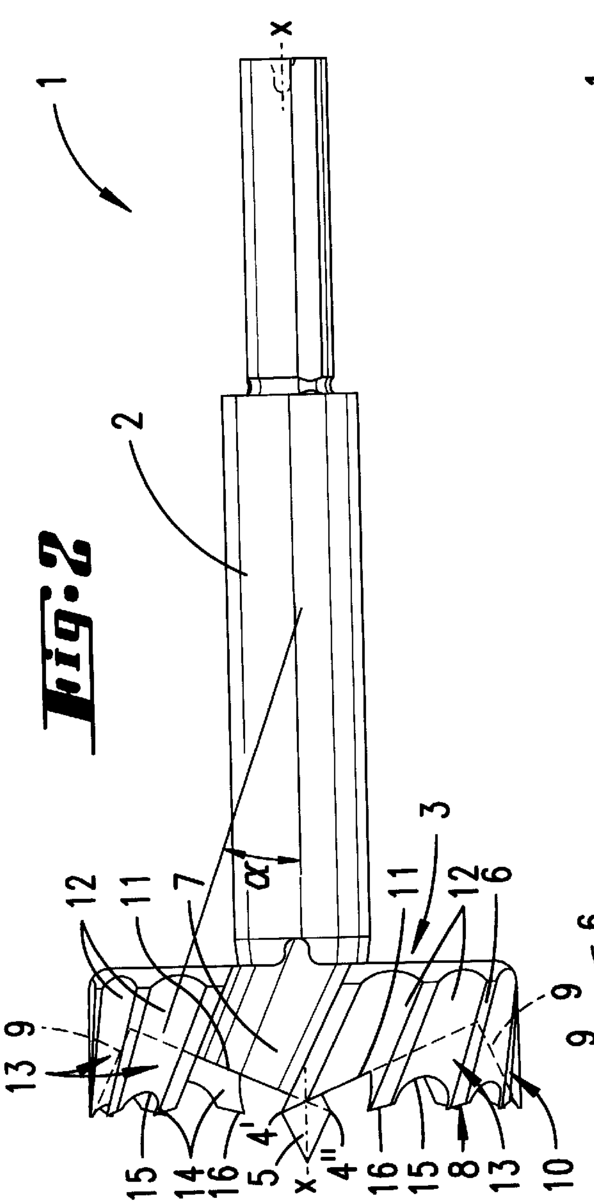
FIG. 2 is the Forstner drilling tool according to FIG. 1, side elevation.
Figure 3:
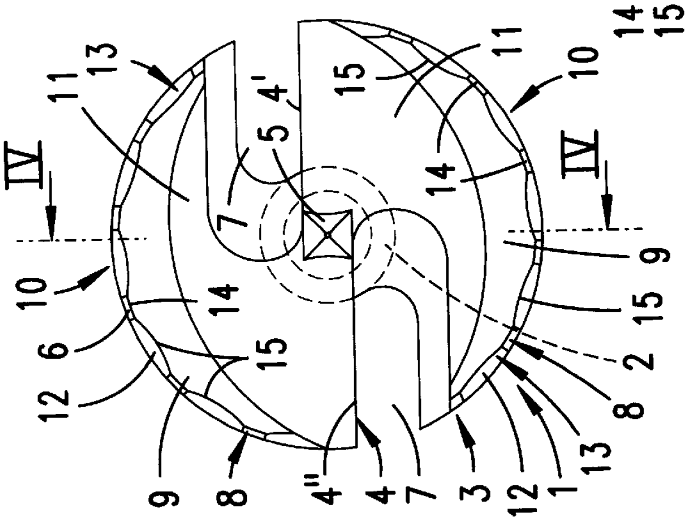
FIG. 3 is the Forstner drilling tool end elevation.

Firstly, with reference to FIG. 1, there is illustrated and described a cylinder head boring tool (1) with the configuration of a Forstner drilling tool, having basically of a shaft (2) for gripping in a chuck and a boring head (3). The latter has essentially a circular cylindrical configuration and has a main cutting edge 4 extending essentially diametrically across the entire circular cross-section, with a centering point (5).

The main cutting edge (4) is interrupted by the centering point, such that each portion 4' and 4" of the main cutting edge lies adjacent a chip channel (7) which opens through the outer wall (6) of the boring head (3) and extends obliquely through the boring head (3).

Each outer end of the main cutting edge (4) adjoins a preliminary cutting edge (8) coinciding with the circumference of the boring head (3), the preliminary cutting edge serving to guide the boring tool (1). Each preliminary cutting edge (8) extends from the end of the main cutting edge (4) around to the edge of the respective other chip channel (7). Due to the essentially circularly cylindrical configuration of the boring head (3), the preliminary cutting edges (8) are cylindrically curved.

Figure 4:
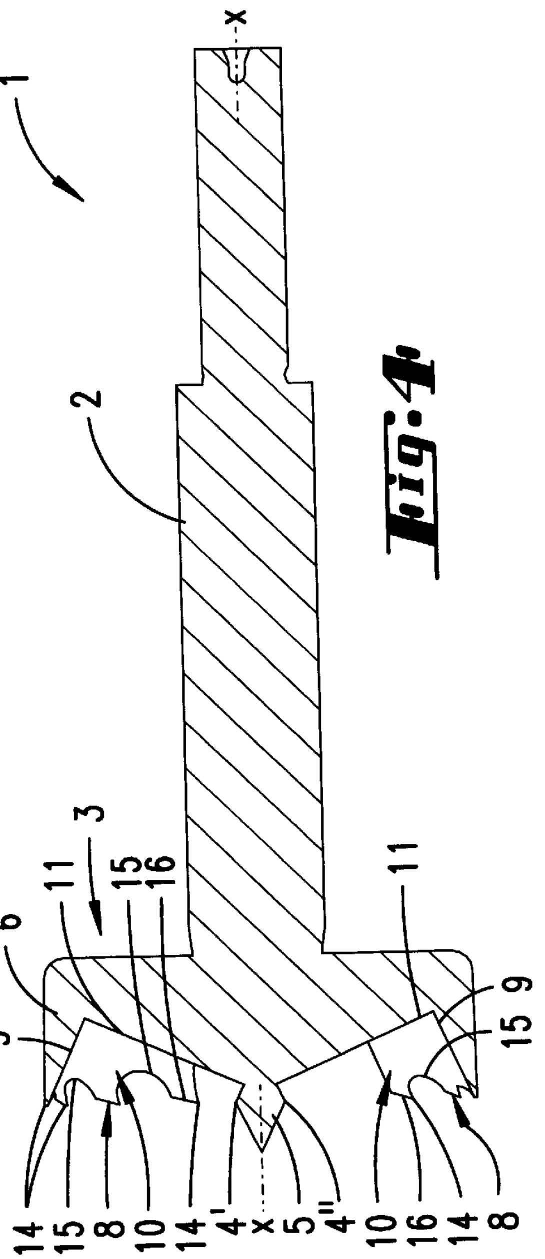
FIG. 4 is an axial section section through the Forstner drilling tool taken along the line IV—IV in FIG. 3.

For each preliminary cutting edge (8) there is provided, inwardly of the outer wall (6), a concave surface (9). The result is, for and defining each of the preliminary cutting edges (8), an arcuately extending preliminary cutter (10) with a wedge-shaped section (compare FIG. 4).

The main cutting edge (4), or the portions thereof 4' and 4" have cut out shearing surfaces (11) which extend flat and continuous as far as the concave surface (9) of the respective preliminary cutter (10) which follows in the rotational direction, such that the surfaces (11) are sloped at approximately 30° with respect to a cross-sectional plane through the boring head (3).

The chip channels (7) have an arcuately rounded base. Each chip channel (7) extends inwardly beyond its respective main cutting edge portion 4', 4". Thus, each arcuate chip channel base extends into the cut out surface (11) of the other portion of the main cutting edge.

The planes of the cut out surfaces (11) each define generally a right angle with the respective concave surface (9.)

The otherwise flat wall (6) is interrupted, in the first example embodiment illustrated in FIGS. 1 through 4, by grooves (12) which have a circular arcuate shape in cross-section. By this means there are formed radial throats (13), which in this first example embodiment constitute indentations in the wall.

Utilizing an end-milling cutter or the like, the grooves (12) are, for example, cut into the wall (6) such that the direction of the grooves (12) is selected to be parallel with the bore axis x—x. However, as can be seen particularly in FIG. 2, a preferred direction is one in which the grooves (12) are angulated with respect to the axis x—x. In the illustrated example embodiment an angle Alpha of about 20° has been selected.

The grooves (12) are open at either end, which means that they extend over the entire length of the boring head in the axial direction, whereby, due to the wedge-shaped sectional configuration of the preliminary cutter (10), tooth-like preliminary cutting segments (14) are formed. In the region where the grooves (12) extend through the preliminary cutter (10), elliptical cut out portions (15) are formed.

Furthermore, each preliminary cutting edge (8) is provided, in the region between two adjacent grooves (12), i.e. in the region of a preliminary cutting segment (14), with a cut-out edge (16), whereby the preliminary cutting edge (8) is in intermittent contact with the workpiece being treated.

The provision of the grooves (12) in the wall (6) achieves the advantageous effect that the Forstner drilling tool (1) heats up to a lesser degree when used. Furthermore, in the same connection, the isolation of preliminary cutting segments (14), preferably provided with cut-out edges (16), also has a beneficial effect on heatgeneration.

Figure 5:
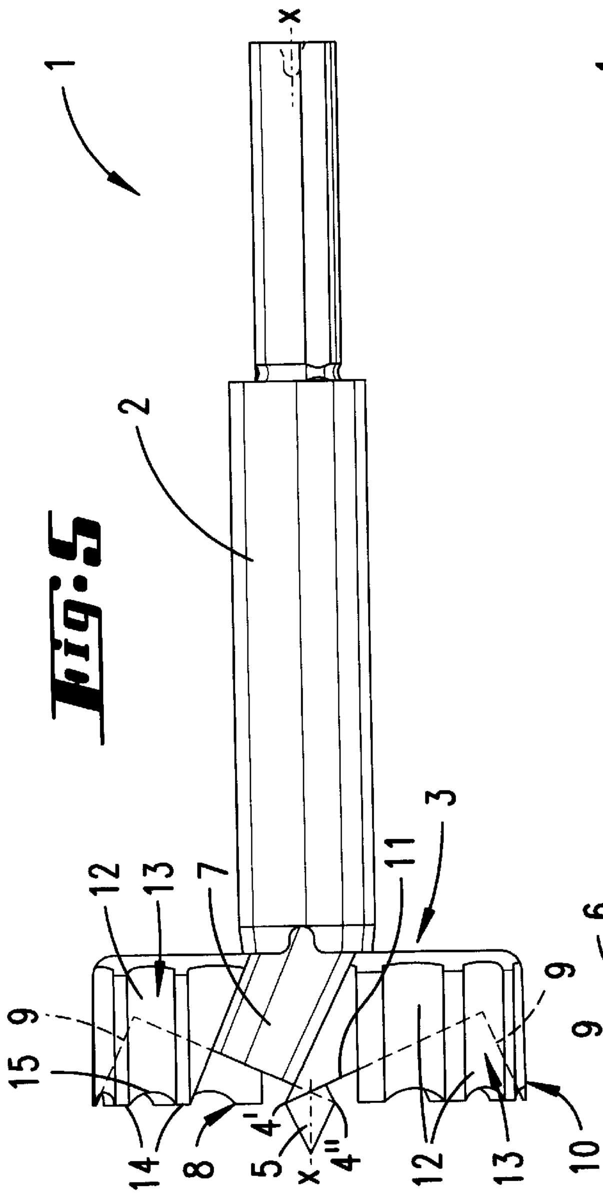
FIG. 5 is a Forstner drilling tool accordance with the invention in elevational view, relating to a second embodiment.
Figure 7:
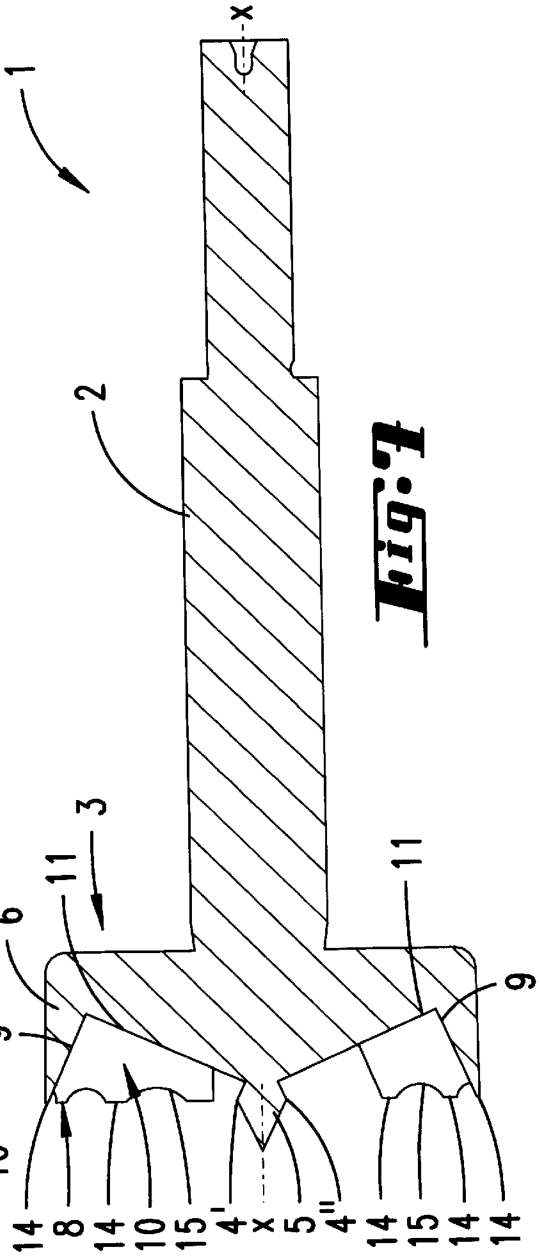
FIG. 7 is a longitudinal section taken along the line VII—VII in FIG. 6.
Figure 6:
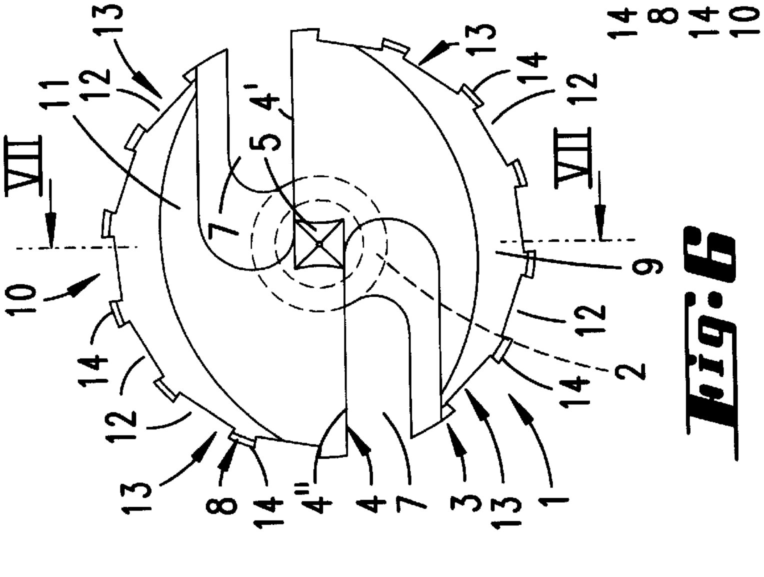
FIG. 6 is an end view of the Forstner drilling tool according to the embodiment of FIG. 5.

A second embodiment of a Forstner drilling tool (1) is illustrated in FIGS. 5–7, this embodiment, like the first, being provided with throats (13) in the form of grooves (12) in the region of the wall (6). However, in this case, an essentially rectangular section has been chosen for the grooves (12). Also, the grooves (12) are aligned parallel to the bore axis X—X.

These grooves (12) too are open at both ends, such that again in the region of the preliminary cutting edges (8), isolated, tooth-like preliminary cutting segments (14) are formed. Also in this embodiment, there are formed cut out portions (15) as determined by the shape of the preliminary cutter (10) which is wedge-shaped in section.

In both of the above-described example embodiments, the throats (13) or grooves (12) have full penetration, meaning that they are open at both ends. However, it would be possible to conceive of embodiments in which the throats (13) are closed at one end or at both ends. The throats (13) or grooves (12) are simply intended to allow a decrease in the heat development in the region of the boring head (3), and not for the purpose of chip removal. The latter occurs along the essentially centrally arranged chip channels (7). With that proviso, the configuration and direction of the throats (13) can be freely selected.

Figures 8, 9, 10:
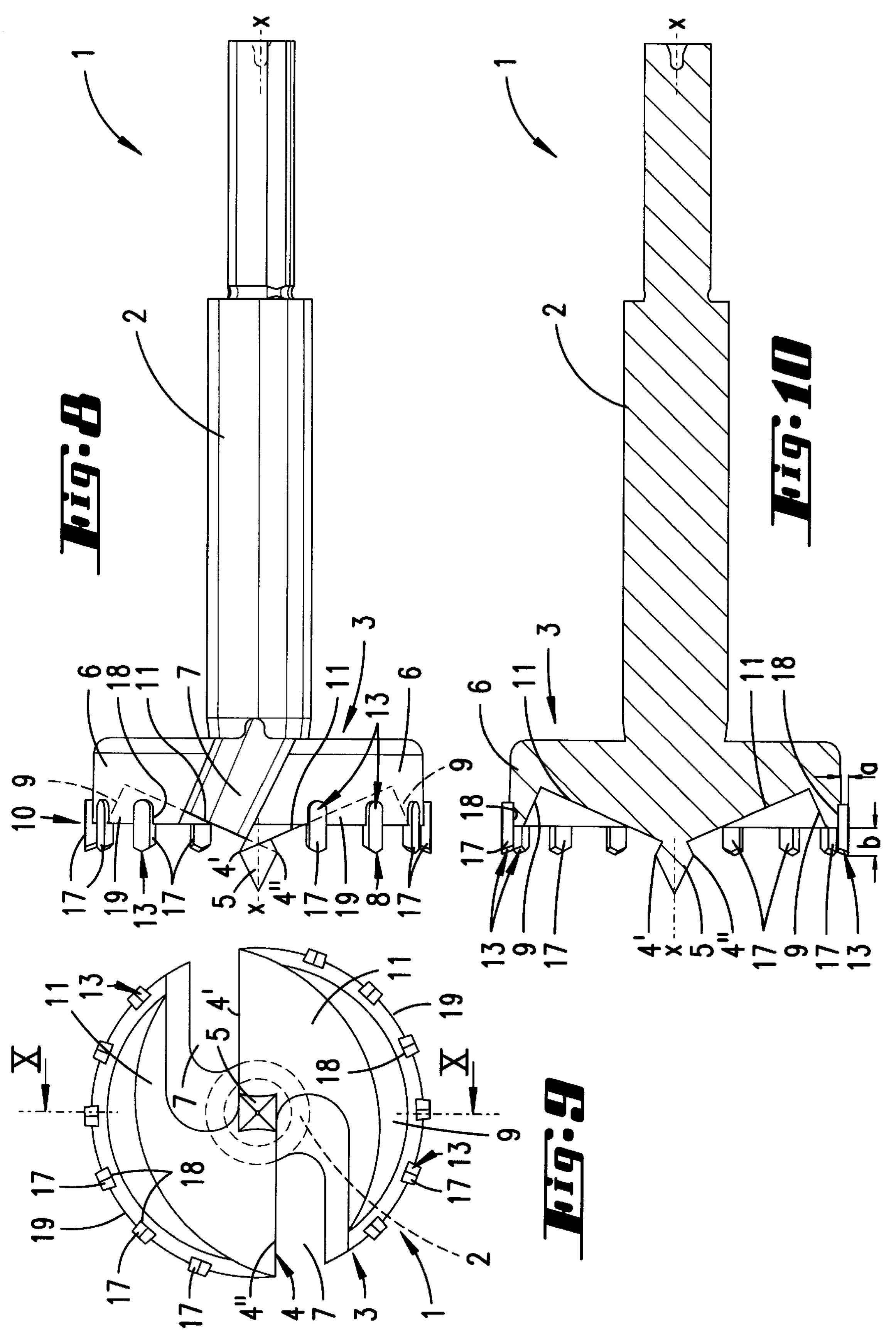
FIG. 8, in a third embodiment, is a side elevation of a Forstner drilling tool with individual teeth.
FIG. 9 is an end elevation of the Forstner drilling tool according to the embodiment of FIG. 8.
FIG. 10 is a longitudinal section taken along the line X—X in FIG. 9.

A third example embodiment of the solution in accordance with the invention is illustrated in FIGS. 8 through 10. By contrast with the example embodiments described above, in this case the wall of the boring head (3) is not interrupted by groove-like throats. Rather, the configuration is selected such that the throats (13) are defined by radially outwardly projecting tooth-portions constituted by individual teeth (17). Thus, the wall (6) is interrupted not by recesses but rather by projections. The individual teeth (17) are made of a hard material and are received in recessed pockets (18) in the boring head (3).

The recessed pockets (18) are formed in the radially outward region of the preliminary cutter (10), are open in the direction toward the outer wall and the leading surface of the boring head (3), and further are provided with an insertion cross-section of dovetail shape. The individual teeth (17) have a cross-section matching that of the recessed pockets (18). The axial length and the radial depth of each recessed pocket (18) is so chosen that an inserted individual tooth (17) is retained with a radial projection a and an axial projection b.

The dovetail cross-section makes pre-assembly possible. This is accomplished by inserting the individual teeth (17) in the corresponding recessed pockets (18) of the wall (6) forming the preliminary cutter (10). Following this, the preassembled unit is heated, such that silver solder for creating the necessary bond can flow into the gaps between the walls of the individual teeth and the walls of the recessed pockets.

The individual teeth (17) thus secured to the boring head (3) together form the preliminary cutter (10) which serves the sole purpose of guiding the boring tool (1).

Depending upon the radial projection a, there are created, between pairs of adjacent individual teeth (10), radial free zones (19) which serve the same purpose as the grooves (12) of the two example embodiments previously described. The thus formed free zones (19) have a positive effect with respect to heat-development in the boring head (3) during the boring process. This effect is even further reinforced in that the individual teeth (17) serving as the preliminary cutter are pointed in the forward or facing direction, and thus constitute a preliminary cutter which contacts the workpiece only at spaced-apart points.

I claims:

1. A cylindrical head boring tool (1), comprising a boring head with a main cutting edge (4) having a centering point (5) and extending essentially diametrically across an entire circular cross-section of the boring head (3), the main cutting edge (4) having cut-out surfaces (11), and chip channels (7) adjacent the main cutting edge (4), the chip channels (7) opening through the outer periphery and extending obliquely through the boring head (3), wherein each end of the main cutting edge (4) is adjacent a preliminary cutting edge (8) coinciding with the circumference of the boring head (3), solely for guiding the boring tool (1), the preliminary cutting edge (8) reaching to the edge of the respective other chip channel (7), and being the peripheral edge of a substantially cylindrically curved wall (6) of the boring head (3), and radial throats interrupting the otherwise smooth wall (6).

2. A cylindrical head boring tool according to claim 1, wherein the throats (13) are wall recesses.

3. A cylindrical head boring tool according to claim 2, wherein the wall recesses form grooves (12) which are parallel to the axis of the tool or are angled with respect to the axis.

4. A cylindrical head boring tool according to claim 3, wherein the grooves (12) have a rectangular or part-circular cross-section.

5. A cylindrical head boring tool according to claim 3, wherein the grooves (12) are open at both ends.

6. A cylindrical head boring tool according to claim 1, wherein an arcuately extending preliminary cutter (10) forming the preliminary cutting edge (8) has a wedge-shaped cross-section which is formed by a concave surface (9) lying opposite the wall (6).

7. A cylindrical head boring tool according to claim 6, wherein the cut-out surfaces (11) of the main cutting edge (4) are planes which meet the respective concave surfaces (9) at substantially a right angle.

8. A cylindrical head boring tool according to claim 3, wherein the preliminary cutting edge (8) has a cut-out edge (16) between two adjacent of said grooves (12).

9. A cylindrical head boring tool according to claim 1, wherein the throats (13) are formed by radially projecting tooth portions of individual teeth (17).

10. A cylindrical head boring tool according to claim 9, wherein the individual teeth (17) are made of hard material and are soldered in place within receiving pockets (18) in the boring head (3) with a radial projection (a) and an axial projection (b).

11. A cylindrical head boring tool according to claim 10, wherein the receiving pockets (18) have a dovetail-shaped insertion cross-section for respective of said individual teeth (17).

12. A cylindrical head boring tool according to claim 1, wherein said boring tool is a Forstner drilling tool.

* * * * *